United States Patent [19]

Prucnal et al.

[11] Patent Number: 5,493,433
[45] Date of Patent: Feb. 20, 1996

[54] TERAHERTZ OPTICAL ASYMMETRIC DEMULTIPLEXER

[75] Inventors: Paul R. Prucnal, Princeton; Jason P. Sokoloff, Robbinsville, both of N.J.

[73] Assignee: Trustees of Princeton University, Princeton, N.J.

[21] Appl. No.: 204,868

[22] Filed: Mar. 2, 1994

[51] Int. Cl.⁶ .............................. H04J 14/00; H04J 14/08
[52] U.S. Cl. .......................... 359/123; 359/117; 359/138; 356/350
[58] Field of Search ....................... 385/16, 18; 359/123, 359/138, 181, 117; 356/350

[56] References Cited

U.S. PATENT DOCUMENTS

| | | | |
|---|---|---|---|
| 4,507,776 | 3/1985 | Smith | 359/138 |
| 4,805,975 | 2/1989 | Utaka et al. | 385/18 |
| 5,144,375 | 9/1992 | Gabriel et al. | 356/350 |
| 5,150,248 | 9/1992 | Alfano et al. | 359/181 |
| 5,357,359 | 10/1994 | Uchiyama et al. | 359/123 |

OTHER PUBLICATIONS

Jinno et al., "Nonlinear Sagnac Interferometer Switch and its Applications", IEEE Journal of Quantam Electronics, vol. 28, No. 4, Apr. 1992, pp. 875–882.
"A Terahertz Optical Asymmetric Demultiplexer (TOAD)" by J. Sokoloff, P. Prucnal I. Glesk, and M. Kane; 1993 IEEE Log No. 9209781; pp. 1041–1135.
"A Terahertz Optical Asymmetric Demultiplexer (TOAD)" by J. Sokoloff, P. Prucnal and I. Glesk and M. Kane; OSA Conference Mar. 15, 1993, Palm Springs, CA pp. 1–3.
"Demonstration of all–optical demultiplexing of TDM data at 250 Gbit/s" by I. Glesk, J. P. Sokoloff and P. R. Prucnal; Electronics Letters Feb. 17, 1994 vol. 30 No. 4 pp. 339–341.
"Performance of a 50 Gbit/s Optical Time Domain Multiplexed System Using a Terahertz Optical Asymmetric Demultiplexer" by J. P. Sokoloff, I. Glesk, P. R. Prucnal, and R. K. Boncek; 1994 IEEE Log No. 9214920 pp. 1041–1135.
"Ultrafast Soliton–Trapping And Gate" by Michel W. Chbat, Benjan Hong, Mohammed N. Islam, Carl E. Soccolich, and Paul R. Prucnal; 1992 IEEE Log No. 9205586 pp. 2011–2016.
"Demonstration of the Nonlinear Fibre Loop Mirror As An Ultrafast All–Optical Demultiplexer" by K. J. Blow, N. J. Doran and B. P. Nelson; Electronic Letters vol. 26, pp. 962–963 (1990).
"Two–wavelength operation of the nonlinear fiber loop mirror" by K. J. Blow, N. J. Doran, B. K. Nayar, and B. P. Nelson; Optics Letters vol. 15, No. 4 Feb. 15, 1990.
"Optical Loop Mirror With Semiconductor Laser Amplifier" by M. Eiselt Electronics Letters Jul. 30, 1992 vol. 28, No. 16 pp. 1505–1506.
"Nonlinear Amplifying Loop Mirror" by M. E. Fermann, F. Haberl, M. Hofer, and H. Hochreiter; Optics Letters vol. 15, No. 13 pp. 752–754 Jul. 1, 1990.

*Primary Examiner*—Leo H. Boudreau
*Assistant Examiner*—Bhavesh Mehta
*Attorney, Agent, or Firm*—David N. Koffsky

[57] ABSTRACT

An optical demultiplexer includes an optical loop having first and second terminals and a mid point. A non-linear optical element is positioned in the loop at a distance $\Delta x$ from the mid point. A first coupler is positioned in the loop and has a gating pulse applied which causes a change in the optical property of the non-linear optical element from a first state to a second state. A second coupler is optically coupled to the first and second terminals and has an input terminal for receiving a series of input optical pulses. The second coupler responds by inducing, for each input pulse, a pair of counter-propagating pulses in the optical loop. Control circuitry causes a gating pulse to be applied to the optical loop and to be timed to switch the non-linear optical element to from a first to a second state after one of the pair of counter-propagating pulses has passed through the non-linear optical element, but before the other counter-propagating pulse has reached the non-linear optical element. In this manner, one counterpropagating pulse is affected by the second state of the non-linear optical element and the other counterpropagating pulse is not, thereby enabling a differential signal to exit from the output of the second coupler to a detector.

9 Claims, 3 Drawing Sheets

TERAHERTZ OPTICAL ASYMMETRIC DEMULTIPLEXER

FIELD OF THE INVENTION

This invention relates to optical switching devices and, more particularly, to an optical demultiplexer that is capable of selecting individual pulses from an input pulse train occurring at a teraHertz rate.

BACKGROUND OF THE INVENTION

High-bandwidth demultiplexing is employed in optical time-division multiplexed (OTDM) communication systems. In OTDM systems, binary signals from plural transmitters are multiplexed onto a single optical fiber. Each transmitter is assigned one time slot within a data frame. Each time slot accommodates a bit of data. To receive data from a particular transmitter, a receiver requires a demultiplexing switch to sample the appropriate time slot in each data frame. One demultiplexing switch is required for each received channel. The demultiplexing switch must have sufficient bandwidth to permit sampling of data in the time slot and must perform a sampling operation every frame. Because such demultiplexers are the only components that must switch pulses having the optical system's aggregate bandwidth, they characteristically limit signal throughput. This is also true in optical packet switching networks. There, data and routing information is encoded in optical packets, which flow through multiple communication nodes before reaching their ultimate destination. The network has a higher capacity if the optical packets are temporally compressed. However, once again an optical demultiplexer is required to read individual bits of information within the packet. Therefore, in packet-switched networks the demultiplexer also limits throughput.

The prior art has suggested various devices for ultrafast demultiplexing of optical pulses to enable switching of pulses that are several hundred femtoseconds long. Chbat et al. "Ultrafast Soliton Trapping AND Gate", Journal of Lightwave Technology, December 1992, describe the use of soliton gates. Soliton gates require tens of meters of special fiber, non-commercial laser sources, and high energy control pulses. Blow et al. "Demonstration Of The Non-Linear Fiber Loop Mirror As An Ultrafast All Optical Demultiplexer", Electronic Letters, Vol. 26, p 962, 1990, employ a non-linear optical loop mirror for demultiplexing optical signals. An optical loop mirror employs a small non-resonant, non-linearity in a fiber and requires long lengths of fiber and costly components. For example, a non-linear optical loop mirror operating with a one pico Joule control pulse requires a kilometer or more of polarization-maintaining fiber, which is cross-axis spliced to compensate for "walk off" between the control pulse and the signal pulse.

More recently, Eiselt in "Optical Loop Mirror With Semiconductor Laser Amplifier", Electronics Letters, Vol. 28, p. 1505, 1992 describes a semiconductor optical amplifier positioned inside a short fiber loop. Used as a switch, the Eiselt structure exhibits a time-resolution which is the recovery time of the amplifier's gain non-linearity. In Eiselt's experiments, that recovery time approximated 400 picoseconds.

Fermann et al. in "Non-Linear Amplifier Loop Mirror", Optic Letters, Vol. 15, p. 752, 1990, describe a switch wherein a neodymium-doped fiber amplifier is inserted at one end of a fiber loop to produce an asymmetry in the phase shift introduced by the non-linear refractive index of the fiber. This configuration, called a non-linear amplifying loop mirror uses the non-linearity of the fiber for switching purposes, not the non-linearity of the amplifier. The amplifier is deliberately used in its linear regime. As a result, the non-linear amplifying loop mirror is similar to other non-linear optical loop mirrors in that it requires a long fiber loop to operate. In the experiments of Fermann, a 306 meter fiber loop was used.

Accordingly, it is an object of this invention to provide an optical demultiplexer which employs low-energy gating pulses and is small enough to be compatible with integrated semiconductor elements.

It is another object of this invention to provide an optical demultiplexer that employs a fiber loop that is compact in structure.

It is a further object of this invention to provide an optical demultiplexer that is capable of operating at a teraHertz demultiplexing rate.

SUMMARY OF THE INVENTION

An optical demultiplexer includes an optical loop having first and second terminals and a mid point. A non-linear optical element is positioned in the loop at a distance $\Delta x$ from the mid point. A first coupler is positioned in the loop and has a gating pulse applied which causes a change in the optical property of the non-linear optical element from a first state to a second state. A second coupler is optically coupled to the first and second terminals and has an input terminal for receiving a series of input optical pulses. The second coupler responds by inducing, for each input pulse, a pair of counter-propagating pulses in the optical loop. Control circuitry causes a gating pulse to be applied to the optical loop and to be timed to switch the non-linear optical element from a first to a second state after one of the pair of counter-propagating pulses has passed through the non-linear optical element, but before the other counter-propagating pulse has reached the non-linear optical element. In this manner, one counter-propagating pulse is affected by the second state of the non-linear optical element and the other counterpropagating pulse is not, thereby enabling a differential signal to exit from the output of the second coupler to a detector. The magnitude of this differential signal depends on both the amplitude and phase difference between the returning counterpropagating light pulses.

DETAILED DESCRIPTION OF THE INVENTION

Figure 1:
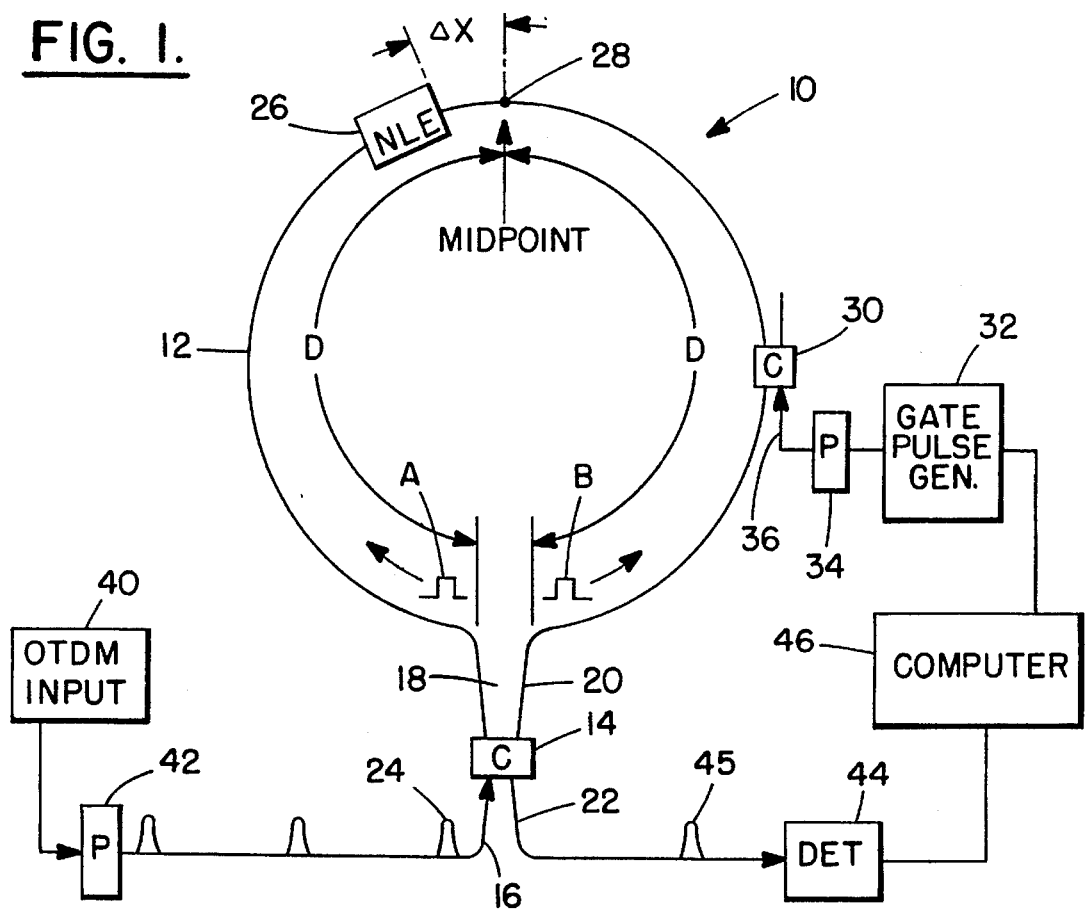
FIG. 1 is a schematic diagram illustrating a system that incorporates the invention hereof.

Referring to FIG. 1, an optical switch is shown that is capable of demultiplexing terabit per second pulse trains. The optical switch includes a non-linear optical element which is asymmetrically placed within a short fiber loop.

The optical switch operates with low-energy gating pulses (less than one pico-Joule) and is small enough to be integrated on a chip.

As shown in FIG. 1, optical demultiplexing switch 10 employs a known loop mirror structure which includes an optical fiber loop 12 that is connected to a 2×2, 3 dB coupler 14 having four ports, i.e., 16, 18, 20 and 22. A light pulse 24 enters coupler 14 via input port 16 and is split into two counter-propagating pulses A and B that are introduced into optical loop 12. Disregarding other effects within optical loop 12, when pulses A and B return to coupler 14 via ports 18 and 20, they interfere in such a way that all of the incident optical power re-emerges from input port 16. However, a light pulse 46 will emerge from output port 22 of coupler 14 if one or the other of pulses A or B experiences an absorption and/or index difference relative to its counterpropagating complement pulse.

A non-linear optical element (NLE) 26 is positioned within optical loop 12 a distance $\Delta x$ from a midpoint 28 of optical loop 12. Midpoint 28 is equidistantly positioned (by distances D) from ports 18 and 20 of coupler 14. NLE 26 exhibits an optical non-linearity with an extremely fast rise time and a relatively slow fall time. The rise time must be less in duration than the bit time slot of an incoming data train and the fall time must be less than the frame time so as enable NLE 26 to be prepared for a next bit time slot in a next frame. It is to be emphasized that the relaxation time of the non-linearity of NLE 26 does not have to be smaller than the bit period—as in all prior art optical switch configurations.

NLE 26 may be any optical device that exhibits a rapid change in an optical non-linearity in response to an applied energy pulse. The optical non-linearity may be evidenced by a change in refractive index, attenuation, or other optical phenomenon. As will be described below, NLE 26 has been configured as a 500 micron long InGaAsP travelling-wave semiconductor optical amplifier. A 600 femtoJoule gating pulse causes a substantial change in the index of refraction and transmission of such an NLE.

To apply a gating pulse to optical switch 10, a second coupler 30 is connected in optical loop 12. A gate pulse generator 32 applies an optical gating pulse via a polarization controller 34 to terminal 36 of coupler 30.

As a result, a portion of the gating pulse is impressed on optical loop 12 and travels to NLE 26 to cause a switch of NLE 26 from a first optical non-linear state to a second optical non-linear state.

An optical time domain-multiplexed (OTDM) signal train is applied to optical demultiplexer 10 via an OTDM input module 40. The OTDM input pulses pass through a polarization controller 42 which causes the input pulses to exhibit a different polarization from the polarization of a gating pulse exiting from polarization controller 34. A detector 44 detects an output demultiplexed pulse 46 from coupler 14 if it exhibits the direction of polarization created by polarization controller 42. More specifically, detector 44 includes a polarization filter which only passes light pulses that have the polarization created by polarizer 42. Light pulses having the polarization created by polarizer 34 are blocked. In this manner, detector 44 distinguishes between an information pulse and a gating pulse which may also appear at terminal 22 of coupler 14. The outputs from detector 44 are fed to a computer 46 which, in turn, controls the application of control pulses to gate pulse generator 32.

The essence of the operation of demultiplexing optical switch 10 is that gate pulse generator 32 applies a gating pulse to NLE 26 after pulse A has passed through NLE 26 and before pulse B has reached NLE 26. In this manner, pulse A is not affected by the switched state of NLE 26, whereas pulse B is affected by the switched state of NLE 26. As a result, when pulses A and B return to coupler 14, they exhibit unequal energies and cause an output optical pulse to be coupled to port 22. It will remembered that if both pulses A and B are of equal magnitude, and neither has experienced a relatively different index of refraction while traversing the loop that their energies cancel and no induced optical output is seen at port 22. Thus, so long as pulses A and B pass through NLE 26 while it is in a first state or in a second state, both are affected similarly and a cancellation of output energies results. Only when pulses A or B are affected differently by switched states of NLE 26, does an optical pulse appear at output port 22.

Figure 2:
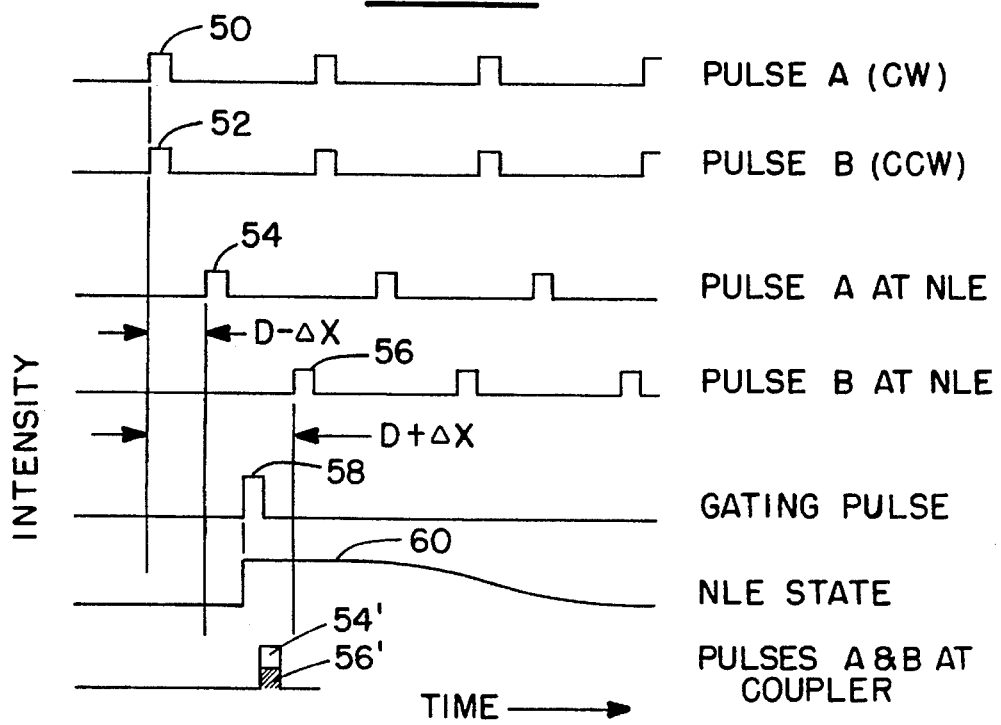
FIG. 2 is a series of waveform diagrams helpful in understanding the operation of the system shown in FIG. 1.

The detailed operation of optical demultiplexer 10 in FIG. 1 will now be described in conjunction with the waveform diagrams shown in FIG. 2. Assume that pulse 50 corresponds to pulse A in FIG. 1 and pulse 52 corresponds to pulse B in FIG. 1. Pulse 50 traverses optical loop 12 in a clockwise direction and pulse 52 in a counterclockwise direction. Pulse 50 arrives at NLE 26 after a time which is related to $(D-\Delta x)$ as shown by pulse 54. Similarly, pulse 52 arrives at NLE 26 after a period of time related to $(D+\Delta x)$—see pulse 56. If a gating pulse 58 is applied to coupler 30 and is timed to arrive at NLE 26 after pulse 54 has passed therethrough, but before pulse 56 has arrived threat, NLE 26 switches to a second non-linear optical state as a result of the applied energy from gating pulse 58. The change in state of NLE 26 occurs very rapidly (on the order of one picosecond) and is illustrated by waveform 60. Assuming that waveform 60 represents a change in index of refraction within NLE 26, pulse 54' is not affected by the changed index, but pulse 56' is affected and exhibits a lessened energy and relative phase shift. As a result, when pulses 54' and 56' return to coupler 14, an output pulse 46 appears at output port 22.

As indicated above, it is necessary that waveshape 60 return to the first unexcited state within a frame time so as to be ready to be gated on again during a next frame so as to be able to select a desired bit from the input data stream. At all other times within a data frame, corresponding pulses A and B experience substantially identical effects of an optical state of NLE 26 and effectively cancel at coupler 14.

As can be seen, the rapid transition in the optical property of NLE 26, followed by a slow relaxation opens a time window that enables an output optical pulse to be fed to detector 44. The pulses that emerge from output port 22 are those located within $\Delta X$ of midpoint 28 when the transition occurs in NLE 26. Therefore, the duration of the time window is $2\Delta x/v$ (where v=speed of light in optical loop 12). This is because the pulse that is propagating counterclockwise (pulse B) has a distance $2\Delta x$ further to travel to NLE 26 than the clockwise propagating pulse (pulse A). Thus, pulse B arrives at NLE 26 $2\Delta x/v$ seconds later. If $2\Delta x/v$ is less than or equal to a bit time slot, then, with proper timing of gating pulse 58, any bit can be demultiplexed from the input optical data stream. A second bit cannot be demultiplexed until NLE 26 has recovered from the transition in its optical properties. As a result therefore the data frame period must be larger than the fall time of the non-linearity.

EXPERIMENTAL

Figure 3:
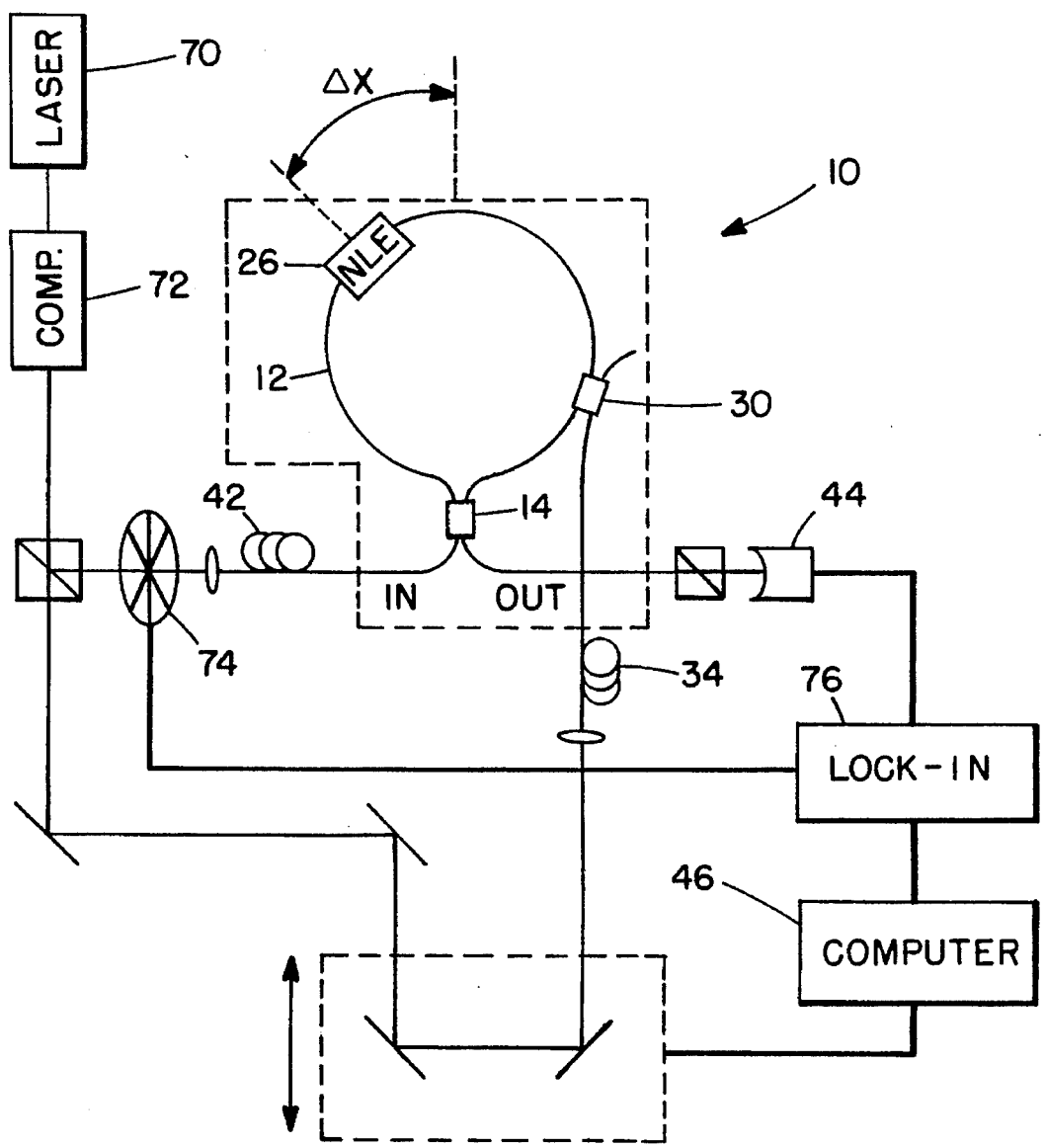
FIG. 3 is a more detailed system diagram illustrating an experimental system used to confirm the operation of the invention.

To demonstrate the operation of optical demultiplexer switch 10 the system shown in FIG. 3 was used. NLE 26 is a 500 micron long InGaAsP travelling-wave semiconductor optical amplifier designed for low polarization sensitivity. A 100 MHz train of 5 picosecond pulses is generated by a pulse-compressed 1.313 micron YLF laser 70 and a compressing stage 72. The resulting pulse is split into fixed-delay 20 fJ signal pulses and variable-delay 600 fJ gating pulses. After fiber coupling, signal and gating pulses are orthogonally polarized and introduced into optical loop 12 through 2×2 couplers 14 and 30. The shape of the optical demultiplexer's sampling window is measured by plotting the time-averaged output of detector 44 versus the delay in the gating pulse. Since optical loop 12 is only several meters in length, polarization is maintained in spite of use of non-polarization-maintaining fiber 12. Thus, the optical demultiplexer's output can be polarization-discriminated from a gating pulse emerging from loop 12.

Further, gating and signal pulses can also be introduced at different wavelengths and be wavelength discriminated by detector 44, provided that both lie within the optical bandwidth of NLE 26. Although the output signal is directly detectable, chopping the signal pulse train by a chopper 74 and following output detector 44 with a lock-in amplifier 76 provides added sensitivity.

Figure 4:
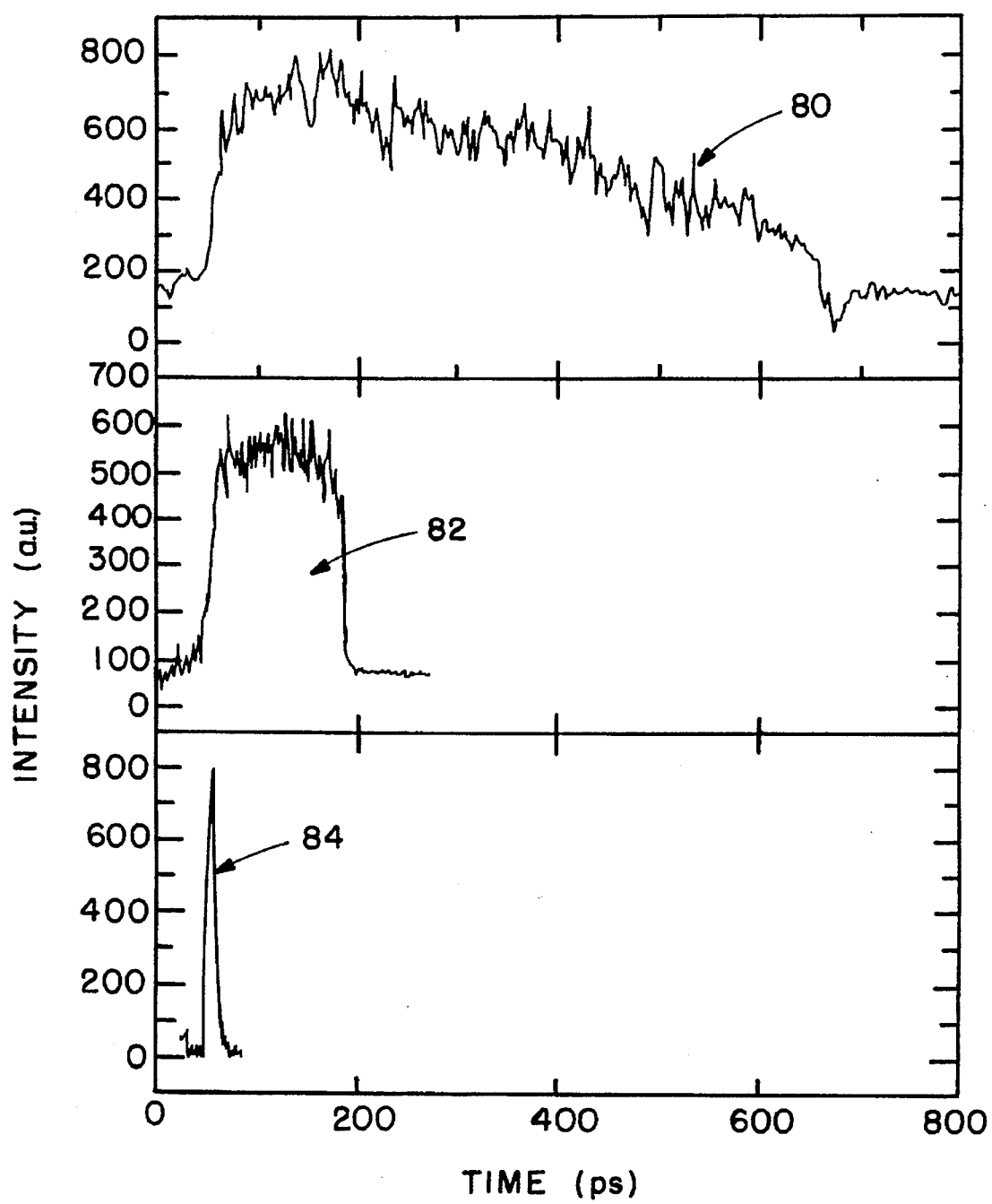
FIG. 4 are plots of intensity versus time and illustrate waveforms detected during the operation of the system of FIG. 3.

Waveform 80 in FIG. 4 shows the shape of the sampling time-window opened between input and output by a gating pulse when $2\Delta x/v$ is approximately equal to the measured 600 picosecond gain recovery time of NLE 26. The time window has a rather complex shape, displaying the general features of the exponentially recovering gain characteristic of NLE 26, but with a dip occurring $2\Delta x/v$ after the window opens. Waveforms 82 and 84 in FIG. 4 show cases when $2\Delta x/v$ is 130 and 20 picoseconds, respectively. The fast rise time of the non-linearity produces both a sharp rising edge and a sharp falling edge. The NLE recovers completely about 800 picoseconds after the transition, setting an approximate lower limit on the frame time.

An OTDM system with an optical demultiplexer 10 having the asymmetry $\Delta x$ will permit each of 40 users to have a 20 picosecond bit time slot in each data frame. Each user would send/receive data at 1/(800 picoseconds)=1.25 Gb/s, with an aggregate system bandwidth of 50 Gb/s. Optical demultiplexer 10 will demultiplex the 20 picosecond pulses from the 50 Gb/s data stream and its output will be a 1.2 Gb/s data stream for an individual user.

The length of the sampling window can be reduced by further reducing $\Delta x$. Several factors will set a lower limit on the sampling window's length. One factor is the duration of the compressed laser pulses. The fundamental limits are set by finite propagation delay of NLE 26 and the intrinsic rise-time of its non-linearity, the larger of which sets a minimum length for the sampling window. The intrinsic rise time of the non-linearity is typically less than a picosecond. The NLE used in this experiment has a propagation delay of approximately 5 picoseconds, but by reducing its length to 100 microns and increasing its DC bias current, its propagation delay can be reduced to one picosecond, without impacting performance. Thus, with minor changes, optical demultiplexer 10 can perform at a terabit per second demultiplexing rate.

It should be understood that the foregoing description is only illustrative of the invention. Various alternatives and modifications can be devised by those skilled in the art without departing from the invention. For instance, while the optical loop and couplers employed herein has been described in the context of either a fiber loop or an integrated optical waveguide, it could be configured as a loop in free space (using appropriate mirrors and beam splitters). In addition, while polarization and/or wavelength diversity have been described as means for discriminating between a gating pulse and a data pulse, amplitude discrimination is also an available, but not preferred, alternative. Accordingly, the present invention is intended to embrace all such alternatives, modifications and variances which fall within the scope of the appended claims.

What is claimed is:

1. An optical demultiplexer comprising:

an optical loop having first and second terminals and a midpoint;

non linear optical means positioned in said loop a distance $\Delta x$ from said midpoint;

first coupler means positioned in said loop;

gating pulse means connected to said first coupler means for applying a gating pulse to said optical loop, an applied gating pulse causing a switch in an optical property of said non-linear optical means from a first state to a second state;

second coupler means optically coupled to said first and second terminals and having an input terminal and an output terminal;

input means for applying a series of input optical pulses to said input terminal, said second coupler means responding by inducing a pair of counterpropagating pulses in said optical loop for each input pulse; and control means for causing said gating pulse means to apply a gating pulse to said optical loop, said gating pulse timed to switch said non-linear optical means from said first state to said second state after one of said pair of counter-propagating pulses has passed through said nonlinear optical means and before another of said pair counterpropagating pulses has reached said non-linear optical means.

2. The optical demultiplexer recited in claim 1 wherein said non-linear optical means, after being switched to said second state by a gating pulse, resets in a time T to said first state without further input energy, said time T controlling when said demultiplexer is ready for a next switched operation.

3. The optical demultiplexer as recited in claim 1 wherein said gating pulse means includes means for polarizing a gating pulse to a first polarization state and said input means includes means for polarizing said input optical pulses to a second polarization state, said optical demultiplexer further comprising:

detector means coupled to the output terminal of said second coupler means and for discriminating between a gating pulse and output pulse corresponding to an input optical pulse.

4. The optical demultiplexer as recited in claim 3 wherein said detector means detects pulses appearing at said detector means which have said second polarization state.

5. The optical demultiplexer as recited in claim 1 wherein said gating pulse means generates a gating pulse of a first optical frequency and said input means applies a series of input optical pulses of a second optical frequency, both said first and second optical frequencies being within the bandwidth of said non-linear optical means, said optical demultiplexer further comprising:

detector means connected to the output terminal of said second coupler means for detecting only optical pulses having said second optical frequency.

6. The optical demultiplexer as recited in claim 1 wherein said first and second states of said nonlinear optical means are different refractive indices.

7. The optical demultiplexer as recited in claim 1 wherein said first and second states of said nonlinear optical means are different levels of optical absorption.

8. The optical demultiplexer as recited in claim 1 wherein said optical loop is configured as either an optical fiber or an integrated optical waveguide.

9. The optical demultiplexer as recited in claim 1, wherein said optical loop is configured in free space.

* * * * *